United States Patent [19]
Rabe, deceased

[11] Patent Number: 5,331,244
[45] Date of Patent: Jul. 19, 1994

[54] PERMANENT MAGNET DC MACHINE HAVING MEANDER-LIKE STATOR WINDINGS FOR PRODUCING HIGH TORQUE WITHOUT EXCESSIVE HEATING

[75] Inventor: Erich Rabe, deceased, late of Buchenbach, Fed. Rep. of Germany, by Hans-Joachim Rabe, Legal Representative

[73] Assignee: ORTO Holding, Luxembourg

[21] Appl. No.: 966,522

[22] Filed: Oct. 26, 1992

Related U.S. Application Data

[63] Continuation of Ser. No. 920,425, filed as PCT/EP91/02502, Dec. 23, 1991, abandoned.

[51] Int. Cl.$^5$ .............................................. H02K 1/00
[52] U.S. Cl. .................................. 310/180; 310/258; 310/114; 310/156
[58] Field of Search ............... 310/180, 258, 259, 260, 310/266, 156, 128, 62, 63, 101, 207, 114

[56] References Cited

U.S. PATENT DOCUMENTS

| | | | |
|---|---|---|---|
| 3,599,023 | 8/1971 | Bottrell | 310/207 |
| 4,115,915 | 9/1978 | Godfrey | 310/180 |
| 4,340,833 | 7/1982 | Sudo et al. | 310/207 X |
| 4,763,053 | 8/1988 | Rabe | 310/180 X |
| 5,093,598 | 3/1992 | Fort | 310/260 |
| 5,191,254 | 3/1993 | Raad et al. | 310/114 X |

*Primary Examiner*—R. Skudy
*Assistant Examiner*—E. To
*Attorney, Agent, or Firm*—Pollock, Vande Sande & Priddy

[57] ABSTRACT

An electronically-commutated DC machine having a permanent magnet rotor, generating a homogeneous magnetic field with linear and radially extending magnetic field lines. The rotor continuously changes polarity within an essentially cylindrical air gap. Meander-like stator means include linear forward and backward extending meander sections within the annular gap. Each linear meander section includes a number of conductor sections arranged geometrically parallel and having an essentially rectangular cross-sectional area. Each conductor section is located within the annular gap so that the longer side of the conductor cross-sectional area extends parallel to the direction of the magnetic field lines. A fan may be provided within the motor housing independently driven by a second stator rotor combination to produce a cooling air flow in the annular gap, cooling the conductor section of the stator means.

25 Claims, 9 Drawing Sheets

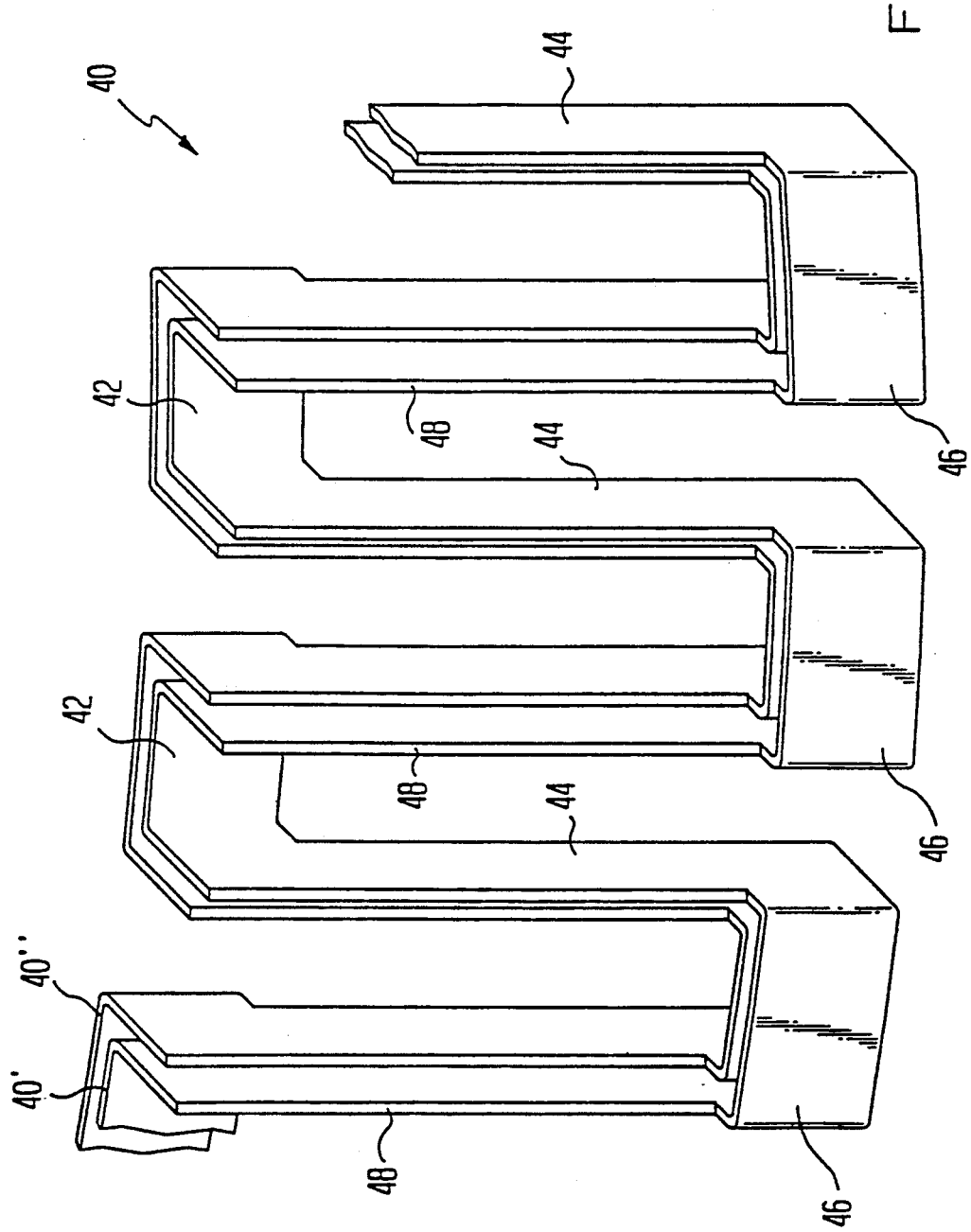

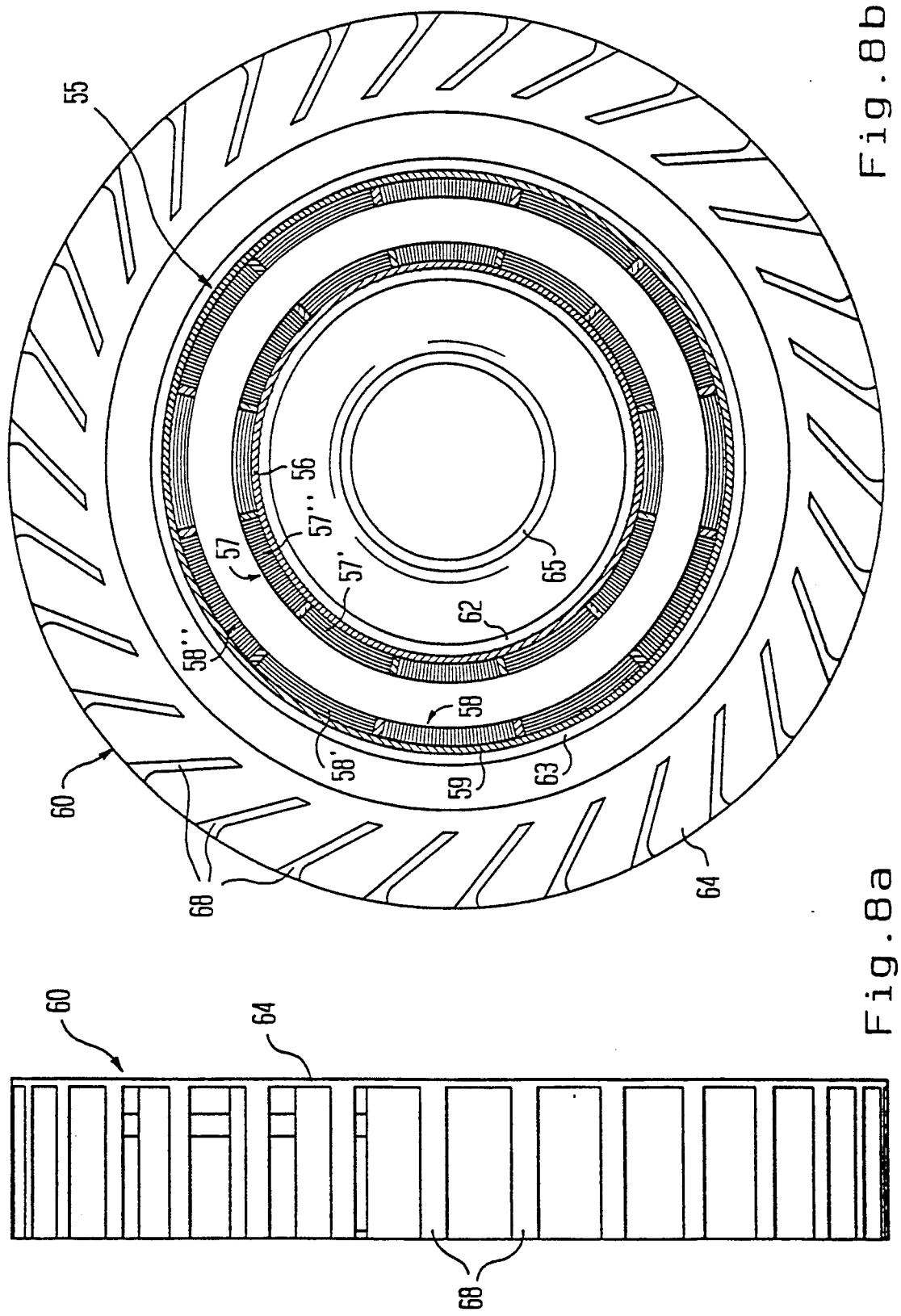

PERMANENT MAGNET DC MACHINE HAVING MEANDER-LIKE STATOR WINDINGS FOR PRODUCING HIGH TORQUE WITHOUT EXCESSIVE HEATING

This is a continuation of International Patent Application PCT/EP91/02502, filed Dec. 23, 1991, which was assigned U.S. Ser. No. 07/920,425, and is now abandoned.

BACKGROUND OF THE INVENTION

The invention relates to an electronically communicated DC machine comprising a permanent magnet rotor. The DC machine may be used in a motor mode or a generator mode. The invention is particularly concerned with an electronically commutated DC motor designed for a higher driving power, for example of 100 kW and more. Preferably, said DC motor according to the present invention may be used as a driving motor for motor vehicles, especially passenger cars.

In the following the invention will be described with reference to an electronically commutated DC motor; this, however, should not cause limitation of the invention.

SUMMARY OF THE INVENTION

More particularly, the invention is concerned with an electronically commutated DC machine, especially a DC motor, comprising a rotational axis and a first permanent magnet rotor having a homogeneous magnetic field with linear and radially extending magnetic field lines and with a continuously changing polarity within an essentially cylindrical annular gap. To this permanent magnet rotor is allocated an air-core, meander-like stator means including linear forward and backward extending meander sections arranged parallel to the rotational axis and extending within the annular gap, wherein each linear forward and backward extending meander section comprises a number of conductor sections arranged geometrically parallel and each having an essentially rectangular cross-sectional area.

An electronically commutated DC motor of said type is disclosed by document EP 0 178 380 A1 related to the same inventor as designated to the present invention. The present invention relates to improvements of the motor concept disclosed by said document. In order to avoids repetitions the content of the document EP 0 178 380 A1 should form a part of the present explanation and specification by reference to said document.

The motors as disclosed by said document are outstanding by the fact that a given motor volume will generate a torque which is many times as high as the torque obtainable by a conventional motor having the same volume or size. However, the comparatively small motor volume increases the problems of removing off the heat resulting from the running motor. The generation of heat limits a further increase of the driving power of a motor having the same small motor volume.

Accordingly, it is an object of the present invention to provide a low weight and compact electronically commutated DC machine or DC motor comprising the previously stated design and providing a still higher torque without excessive heating, even under often and highly changing load conditions.

Another object of the present invention is to provide a DC motor of the previously stated design, which is suited as a driving motor for motor vehicles and which provides an especially high peak torque, for example a peak torque of 280 Nm and more and which provides a high power rating for example a power rating of 100 kW and more.

A further object of the present invention is to improve the manufacturing and the assembling of a DC motor of said type. Especially, a mechanically solid, self-supporting meander-like stator means should be provided which allows an easier manufacturing and a simple insertion in a given annular gap at the permanent magnet rotor.

Still a further object of the present invention concerns the arrangement of a cooling means within the housing of the DC machine. Such a cooling means may generate a cooling air flow for cooling the components of the driving power track, according to the actual requirements.

Finally, according to a further object of the present invention, a concept motor-in-motor should be realized with a DC machine of the above-stated design. According to said concept, within an essentially cylindrical driving power track a further essentially cylindrical driving track is arranged about the same rotational axis, which may be controlled and rotated independently of the first driving power track.

Starting from an electronically commutated DC machine, a DC motor is provided comprising
- a first permanent magnet rotor having a homogeneous magnetic field with linear and radially extending magnetic field lines and with a continuously changing polarity within an essentially cylindrical annular gap, and
- an air-core, meander-like stator means including linear forward and backward extending meander sections arranged parallel to a rotational axis and extending within the annular gap, wherein each linear forward and backward extending meander section comprises a number of conductor sections arranged geometrically parallel and having each an essentially rectangular cross-sectional area, an aspect (solution) of the present invention is characterized in
- that each conductor section is arranged within the annular gap in such a manner that the longer side of the conductor cross-sectional area extends parallel to the direction of the magnetic field lines.

Conventionally, with motors of said type the conductor section having a rectangular cross-sectional area have hitherto had their longer side brought into engagement with a ring-shaped stationary return circuit member or with another carrier means made from insulating material and arranged parallel to the magnetically active annular gap. Obviously, such an arrangement is appropriate for increasing the conductor engaging surface in order to enhance the stability of the conductor arrangement.

Higher motor performances require larger conductor cross-sectional areas in order to keep the power loss at a minimum. With the known arrangement necessarily significant dimensions of the conductors are arranged in a magnetic field section comprising various magnetic field strengths within the conductor area. According to the present invention, it has been found that with said stated arrangement, significant eddy currents will occur even in copper conductors.

The present invention provides instead a 90° turned arrangement of the rectangular cross-section conductors within the magnetically active annular gap so that within said annular gap the longer side of the conductor cross-sectional area is arranged parallel to the direction of the magnetic field lines. Practically, the complete conductor cross-sectional area is always located within a field section having the same homogeneous magnetic field. The generation of eddy currents within the conductor sections located within the magnetic annular gap is reduced significantly.

According to the present invention, it has been found that the inventive arrangement of the rectangular cross-sectional conductor sections within the magnetically active annular gap reduces the eddy current losses occurring in said conductor sections to such an amount that with a given motor volume or size the motor power rating may be increased by 100%.

Preferably, the DC motor according to the present invention comprises a permanent magnet rotor including a number of permanent magnet poles polarized radially (that is essentially vertical to the rotational axis) and forming an outer ring and an inner ring, respectively, such that an annular gap is formed between the outer ring and the inner ring. In each ring adjacent poles are polarized alternatingly such that magnetic south or north of the outer ring are arranged oppositely to magnetic south or north of the inner ring. This arrangement provides a permanent magnet rotor having a homogeneous magnetic field with linear and radially extending magnetic Held lines and with a continuously changing polarity within an annular gap.

Each ring-shaped arrangement of permanent magnet poles may consist of a closed ring made from permanent magnet material and having adjacent regions polarized alternatingly. A closed ring made from permanent material increases the stability and reduces the efforts in assembling the permanent magnet rotors. Especially, in case of expensive permanent magnet materials, for example such as Sm/Co sinter material, it is advisable to make the ring-shaped arrangement from single elongated elements consisting of a permanent magnet material. Said single elements comprise a back, and said back is attached to a further ring made of magnetically conductive material. Preferably, each ring-shaped arrangement comprises a number of single magnet elements, in order to form a solid ring-shaped permanent magnet arrangement. Single magnet elements require less magnet material. A precisely mechanical machining and a homogeneous magnetization within a single magnet element may be obtained.

Preferably, a distance between two adjacent magnet elements in a given ring-shaped arrangement, that is a neutral zone, may be selected essentially equal to a radial dimension (length) of the annular gap. This avoids a magnetic shunt between adjacent opposite magnets within a given ring-shaped arrangement. The homogeneity of the magnetic field within the magnetically active annular gap is increased still further.

Each ring-shaped arrangement of permanent magnet material comprises a side distant to the annular gap; preferably, said distant side of the ring-shaped arrangement is supported by a further ring made from magnetically conductive material closing a magnetic flux. This arrangement increases the magnetic field strength within the annular gap and provides a still more homogeneous magnetic field.

According to a further aspect of the present invention, the meander-like stator means comprises several electrically separated conductor means per phase; the number of conductor means are arranged geometrically parallel and form together a meander-like array. Each conductor means has a comparatively large conductor cross-sectional area in order to keep the conductive power loss at a minimum. In addition, each conductor means comprises a rectangular cross-sectional area having at least a long side and at least a narrow side, wherein a ratio of the long side length to the narrow side length is larger than 2:1. Preferably, the conductor means has rectangular conductor cross-sectional areas, wherein the ratio of the long side length to the narrow side length is larger than 4:1, for example being 10:1 and more. A preferred embodiment of a DC motor according to the present invention comprises a meander-like stator means consisting of several bands or strips made from copper, wherein each copper strip is arranged geometrically parallel and distant to the adjacent copper strip, and wherein each copper strip comprises a rectangular cross-sectional area having a length of about 12 mm and a width of about 1 mm. An alternative embodiment of a meander-like stator means has been made of a practically continuously long copper strip having cross-sectional dimensions of $5 \times 2$ mm.

A sufficient spacing is provided between adjacent conductor means of the meander-like stator means in order to provide without any additional insulation material an independent current flow within each conductor means, for example in order to provide a parallel current flow in some conductor means and to provide a serial current flow in another group of conductor means; for example, to provide a parallel or a series connection of different conductor means of a meander-like stator means depending on the mode of operation of the DC machine. Further, said spacings between adjacent conductor means allow an unrestricted flow of cooling air to and between the conductor means. In addition, said spacings may be secured by insulating distance pieces inserted in regular intervals within the spacing between adjacent conductor means. In addition, each conductor means may comprise an insulating coating.

According to a further aspect of the present invention, the meander-like stator means may comprise two electrically separated, ring-shaped meander-like conductor arrays. Each meander-like conductor array may comprise a number of linear forward extending meander sections and linear backward extending meander sections providing a spacing between the forward extending meander sections and the backward extending meander sections. A linear meander section of another electrically separated meander-like conductor array may be inserted within said spacing without engaging the adjacent meander sections. Each of said two electrically separated, ring-shaped meander-like conductor arrays may comprise several conductor means, for example four conductor means, as stated above. For example, the two electrically separated meander-like conductor arrays may be controlled with a 90° phase displacement. In this case, a DC motor may be provided starting from any rotor position.

Preferably, the number of conductor means is selected depending on the conductor cross-section area and on the spacing between adjacent conductor means such that the complete width of a meander section comprising several conductor means does not exceed half a pole width of the permanent magnet poles. Considering additionally the width of the neutral zone between adjacent permanent magnet poles, a commutation is easily achieved wherein a given number of conductor means forming a meander section is located within a magnetic field having a given uniform polarity. The magnetic field which is induced by a current flow through the stator means depending on the current flow direction and the polarity of the adjacent permanent magnets is used optimally.

According to a further aspect of the present invention, a control circuit is provided, which allows a parallel connection or a series connection of the single electrically separated conductor means forming the meander-like stator means. Such a change-over from serial connection to parallel connection or vice versa of the single conductor means allows a further significant adaption to the specific mode of operation or power requirement of a vehicle driving motor. The vehicle starting phase requires an especially high torque combined with a comparatively low number of revolutions per minute. In this specific situation, a serial connection provides an extraordinarily high torque. Due to the low number of revolutions per minute, the counter EMF induced within the stator means is low and may be tolerated. Having reached a desired vehicle speed, the connection of the conductor means may be switched to a parallel connection. A parallel connection allows a higher current flow and provides a higher motor power, as is desirable for higher vehicle speeds. This flexibility of torque and power rating of the motor reduces the requirement to be met by a vehicle change speed gear. The DC motor according to the present invention and the control circuit thereof may take over or replace an essential part of the functions of a conventional change speed gear of a vehicle.

A number of geometrically parallel conductor means arranged in spaced relationship form the meander-like stator means; said conductor means form successively:
- a linear forward extending meander section (extending parallel to the rotational axis in a first direction);
- a first winding head (located above the magnetically active annular gap);
- a linear backward extending meander section (extending parallel to the rotational axis in an opposite second direction);
- a second winding head (located underneath the magnetically active annular gap); and again
- a linear forward extending meander section; and so on.

According to a further preferred aspect of the present invention, the linear forward or backward extending meander sections are arranged completely within the magnetically active annular gap of the permanent magnet rotor. As stated above, each linear forward extending conductor section is connected with the next following backward extending conductor section by a winding head. Preferably, the conductor portions forming each winding head comprise essentially the same cross-sectional area as the conductor sections forming the next following linear meander section. According to a further preferred aspect, each winding head stands out above or below the magnetically active annular gap in the radial direction from an imaginary extension of said annular gap, followed by a right angle, and then it extends essentially parallel to the annular gap, but outside of said imaginary extension of the annular gap, followed by a further right angle in order to enter again said imaginary extension and merge with a conductor section forming the nect following linear backward extending meander section. This arrangement requires a minimum expenditure of manufacture and provides with simple fastening means a solid self-supporting arrangement of several electrically separated geometrically parallel extending conductor means forming together a meander-like stator means.

The winding heads located below the annular gap may comprise foot portions inserted in fitting grooves of a stator supporting means. Spacings are provided between adjacent conductor sections forming together a linear forward or backward extending meander section. Small insulating distance pieces may be inserted in said spacings in order to secure a given distance between adjacent conductor sections. A larger spacing is provided between a linear forward extending meander section and the next following linear backward extending meander section of the same or of another meander-like conductor array. An adapted larger insulating distance piece may be inserted in said larger spacing and extend along the complete annular gap length. The smaller and larger distance pieces are each made of a thermo-stable, electrically insulating and magnetically inert material, as for example ceramic materials such as aluminum oxide. Even with very significant magnetic field strengths resulting in respective magnetic forces, said insulating distance pieces provide a sufficient stability of a self-supporting meander-like stator means.

Plane flat-material may be used to manufacture a meander-like stator means of said type, and strips of a desired configuration may be punched out or cut off from said flat-material. Thereupon, these plane strips being formed by male dies of a press, in order to obtain the desired three-dimensional structure. A solid self-supporting meander-like stator means may be made of copper sheet metal having a thickness of 1 mm. An exemplary embodiment of a stator means of said type is illustrated with FIG. 3.

Starting from a given permanent magnet, the magnetic field strength within the annular gap increases in a quadratic function versus a decrease of the annular gap length (that is the dimension of the annular gap in a radial direction). Therefore, it is useful to maintain the annular gap length as low as possible, and to select a distance between oppositely arranged permanent magnet poles in such a manner that these poles rotate with respect to the conductor means just contactless. Due to the stability of the conductor means arrangement, and due to the accuracy of the manufacturing facilities, a distance between a circular path of the permanent magnet poles and the stationary conductor means sections may amount to a few 1/100 mm only.

The meander-like stator means comprises winding heads; the arrangement of these winding heads outside the annular gap complicates assembling the DC machine. In a given case, an outer magnet ring may be made from two half-shells which may be assembled to a closed magnet ring following the insertion of the stator means into the annular gap. However, in any case, it is desirable to form the inner magnet ring like a closed ring. However, a meander-like stator means cannot be inserted easily into such a closed inner magnet ring, if the stator means comprises winding heads arranged outside to the annular gap, that is between the annular gap and a rotational axis.

According to a further aspect of the present invention, a further embodiment of a DC machine comprises at least a meander-like stator means having linear forward extending meander sections and linear backward extending meander sections and a winding head connecting said forward and backward extending meander sections, wherein at least the above located winding heads being arranged within an imaginary extension of the annular gap, such as to allow an axial insertion of said meander-like stator means into the annular gap.

This embodiment of the stator means provides for a much easier assembling of the DC machine. The rotor means may be completed in advance and comprises a closed ring made from magnetic return circuit material, each for the inner ring-shaped permanent magnet arrangement and for the outer ring-shaped permanent magnet arrangement; these closed rings support the single elements made from permanent magnet material for a long service life. These closed rings may be fastened easily at a rotor supporting means, for example by utilizing a shrinkage due to a thermal cooling of the closed ring; in this case the closed ring is shrunk on ring-shaped projections formed at the rotor supporting means. Otherwise necessary locking means or fastening means may be avoided, which otherwise may cause an unbalanced mass of the rotating rotor means. The stator means can be formed mechanically solid and self-supporting, and the stator means may be manufactured with an accuracy of a few 1/100 mm in the circumferential area thereof. The stator means is fastened to a bottom plate of the DC machine, and the such fastened stator means may be inserted into the magnetically active annular gap when assembling the stationary part and the rotating part of the DC machine.

Another preferred embodiment of the DC machine comprises a meander-like stator means having a first essentially semicircular conductor array segment and a second essentially semicircular conductor array segment electrically separated from the first conductor array segment. The both conductor array segments comprise the same circumferential dimension and being arranged within the annular gap. In addition, the linear forward extending meander sections and the linear backward extending meander sections of the second conductor array segment being staggered by about the half pole width of the permanent magnet poles in the annular gap's direction with respect to the linear forward extending meander sections and linear backward extending meander sections, respectively, of the first conductor array segment.

In this context, "width" denotes a dimension in the circumferential direction of the annular gap; in the same manner, "length" denotes a dimension in a radial direction referred to the rotational axis of the DC machine.

The semicircular conductor array segments comprise additionally return sections which connect the conductor sections of the final backward extending meander section with the respective conductor sections of the starting forward extending meander section. Thereto, an electrical serial connection of the complete number of conductor sections in the linear forward extending meander section and linear backward extending meander section is provided, despite the use of semicircular conductor array segments.

Two conductor array segments of this type may be controlled with a 90° phase displacement. In the motor mode a DC motor may be obtained which starts running easily from any rotor position. A 100 kW motor having 30 permanent magnet-poles on a rotor circumference of about 100 cm provides superior synchronous running properties. Angle dependent torque variations can be avoided in a large extent. Each of the both electrical separated and staggered arranged semicircular conductor array segments has the function of a cylindrical stator means and allows an excellent control of a starting phase and of a running phase of a motor mode. The annular gap length may be reduced and requires slightly more than a length extension of a conductor section, because there is only a single one-layered cylindrical stator means consisting of two conductor array segments within the annular gap.

With this design of a meander-like stator means, the gaps between adjacent linear forward and backward extending meander sections are not utilized, because there are no conductor sections of the stator means present within this gaps. This may be tolerated in the case of a relatively narrow magnetically active annular gap, for example when the annular gap length does not exceed 6 to 8 mm, and in the case of highly effective magnet materials, for example Co/Sm sinter materials, because a magnetic flux density of for example 1.4 Tesla and more may be obtained within the annular gap. With such a high magnetic flux density within the annular gap the number of conductors of the stator means has to be reduced, in order to avoid an excessively high generator voltage in the motor mode at high revolutions per minute. However, when using less flux providing permanent magnets, for example conventional ferrites, then an additional utilization of these gaps within the stator means may be recommended.

In this case an embodiment of the DC machine may be provided having a stator means which comprises a first meander-like conductor array formed essentially as a 360° cylinder, and having the winding heads arranged within an imaginary extension of the annular gap, and having spacings of uniform width between adjacent linear forward and backward extending meander sections. Additionally, a second meander-like conductor array is provided comprising second linear forward and backward extending meander sections and second winding heads. The second meander sections are inserted into the spacings of the first meander-like conductor array in such a manner that the both conductor arrays being arranged intermashing and comprise the same circumferential dimension. The second winding heads will be arranged in a radial direction outside of an imaginary extension of the annular gap. With this embodiment both, the upper winding heads and the lower winding heads of the second meander-like conductor array are arranged in a radial direction outside of an imaginary extension of the annular gap.

With this embodiment at least the inner magnet ring of the rotor may be formed as a closed ring. Adjacent to this closed inner magnet ring, the stator means may be inserted easily into the rotor means. The outer magnet ring of the rotor means comprises two semicircular half-shells. The stator means will be inserted in the annular gap, and thereafter these two semicircular half-shells will be assembled and locked to a closed magnet ring.

A further aspect of the present invention concerns a meander-like stator means for use with a DC machine of the claimed type and which may be manufactured more easily. A stator means is intended having mechanically solid and self-supporting property, and following a fastening operation at a stator foot portion or near by to a lower winding head, the stator means shall extend into the annular gap and shall withstand substantially mechanical forces without any mechanical deformation.

A first embodiment of a stator means of this kind comprises a first conductor array or a number of conductor array segments each made of a single strip of continuous strip-like conductor material having an essentially rectangular cross-sectional area. For example, an insulated conductor material made of copper and having a cross-sectional area of 5×2 mm may be used. In the initial phase, this strip-like conductor material is practically continuously long and essentially linear. This strip-like conductor material will be bent right-angled in given distances and step-by-step, in order to obtain a meander-like stator means as illustrated schematicly with FIGS. 4a and 4b. For example, the step-by-step right-angled bending may be achieved by means of a device comprising at least a groove for receiving a linear piece of conductor material. This groove terminates at a guiding surface aligned right-angled to this groove. Further, a rotatably arranged roller is provided, which may be moved along this guiding surface. Step-by-step, a section of the conductor material extending beyond the groove with a given length will be bent right-angled by means of this roller and engaged to the guiding surface.

A practical embodiment of a meander-like stator means of said type comprises a semicircular conductor array segment having 14 linear meander sections, wherein each meander section comprises 5 electrically insulated conductor sections arranged distantly to each other. The distance between two adjacent conductor sections of a meander section enables a forced flow of cooling air and reduces a self-induction when a current flow direction is reversed.

The winding heads forming conductor sections engage each other. The return sections are arranged adjacent to the lower winding heads. The conductor sections forming the lower winding heads and the return sections are attached together; optionally, the conductor sections forming the upper winding heads may be attached together; an electrically insulating, hardenable resin may serve as glueing or adhesive agent. Glueing by means of a hardenable resin increases the stability of the stator means arrangement. Following an at least partial glueing or stabilizing treatment, the still plane stator means is deformed to a semicircular cylinder segment or to a 360° cylinder. This deforming may be achieved by means of a press comprising suited curved dies, and the initially plane stator means is deformed step-wise and section-wise between this male die and a mould.

A solid self-supporting meander-like stator means is obtained comprising return sections which are inserted into a ring-shaped groove or channel-like profile formed at a base plate of the DC machine; the return sections are fixed within said groove or profile. The accuracy and the stability of the stator means are excellent allowing a circulating path of the permanent magnets of the rotor in a distance of a few 1/100 mm to the stationary stator means.

Preferably, the width of the magnetically active annular gap (air gap)—that is the dimension in radial direction with respect to the rotational axis—amounts only a little more than the length dimension of a conductor cross-sectional area of the stator means. The minimum width of the annular gap is obtained with a given conductor cross-sectional area, and the maximum magnetical flux density is obtained with a number of given permanent magnets. However, when utilizing two semicircular conductor array segments being staggered with respect to the permanent magnet poles and being controlled with an electrical phase displacement, then an effect of several stator means in an air-gap is obtained with respect to the starting mode in every rotor position and with respect to the sycnchronous running properties.

A further aspect of the present invention concerns another embodiment of a stator means comprising a composed meander-like conductor array consisting of a number of winding head elements and of a number of meander section elements. Each of these elements has been prefabricated in a single state, for example has been punched out of a copper sheet with given thickness. The meander section elements comprise opposite end sections; each end section comprises an extending lug having a slot.

The winding head elements comprise a conductor cross-sectional area adapted to a given current flow, and being larger than the cross-sectional area of the meander section elements. The upper winding head elements and the meander section elements comprise the same length dimension. Each winding head element comprises a recess, and the lug of the meander section element may be inserted in this fitting recess. Thereafter, the both lug sections are beaded in opposite directions. Said beading operation provides a composed, mechanically solid conductor array and guaranties additionally an electrically conductive connection of the meander section elements and the winding head elements. Optionally, a point welding may be additionally provided. Adjacent meander section elements being arranged distantly to each other in order to provide spacings allowing a cooling air flow. The lower winding head elements may comprise a larger width dimension and may comprise additionally bores for passing fastening screws. By means of these fastening screws, the lower winding head elements may be fastened directly to a base plate of the DC machine in such a manner, that the meander section elements extending vertically and the upper winding head elements may be inserted into the annular gap provided between two ring-shaped permanent magnet arrangements of the rotor means. The assembling of the number of single, prefabricated punch pieces to a composed meander-like stator means provides for an easy, fast and low-cost manufacturing of said composed stator means.

According to a further preferred aspect of the present invoice, the stator means comprises an air core, this means, the stator means is made ironless and consists essentially of the conductor material, especially copper, of the conductor means and of the distance pieces, provided optionally. Despite the significant dimensions of the conductor cross-sectional area, the specific arrangement of the conductor means according to the present invention—having the long side of the rectangular conductor cross-sectional area arranged parallel to the magnetic field lines within the magnetically active annular gap—reduces significantly any eddy current losses. Running in the motor mode, any self-heating up or heat generation of the motor is reduced significantly. Even in phases of high and extremely high power requirements, the motor is enabled to run for a longer period of time and/or under a higher permissible current density. In a generator mode of the DC machine, the eddy current losses are reduced. In this case, too, heating-up of the conductor means is reduced. The temperature dependency of the specific conductivity influences the internal resistance of the conductor means. In view of the fact that the internal resistance of the generator is reduced, a higher current can be drawn comprising the same voltage.

According to a preferred aspect of the present invention, a DC machine as described above may be typically used as a vehicle driving motor. As far as the vehicle is "pushing" (for example running downhill or during a braking operation), the identical machine may be used in a generatoric mode. The obtained alternating voltage is rectified and the resulting DC current may be used as charging current and will be controlled and introduced to the storage battery.

The afore mentioned permanent magnet rotor and the meander-like stator means form a first driving track which—in the motor mode—forms time main driving power track which generates the desired (mechanical) driving power, for example in an amount to 100 kW. If a still higher driving power is desirable or required, at least a further driving power track may be provided within said first driving power track in the same rotational plane around the same rotational axis. Preferably, said further or second driving power track has a similar design and comprises a second permanent magnet rotor and a second meander-like stator means.

According to a further preferred aspect of the present invention, an induced or forced cooling of the stator means and/or of the permanent magnet rotor is provided. Preferably, the inner and/or the outer ring-shaped arrangement of permanent magnet material and the attached magnetic conductive material comprise aligned openings, and a forced flow of cooling air through said openings into the annular gap is provided. Especially and preferably, a respective cooling air flow may be generated independently of a rotation of the first permanent magnet rotor within the motor housing as stated in detail in the following.

To said end and in accordance with a further embodiment of the present invention, a second independent controllable driving track is arranged within the housing of the first DC machine or DC motor. Said second driving track drives a fan which generates cooling air to be forcewise introduced into the annular gap of the first permanent magnet rotor.

In this respect, a further embodiment of a DC machine according to the present invention starts from an electronically commutated DC machine, especially electronically commutated DC motor, comprising a first meander-like stator means and a first permanent magnet rotor having a number of first permanent magnet poles polarized radially and alternatingly, and forming together a first, essentially cylindrical driving track, and at least a further, second, essentially cylindrical driving track formed within said first driving power track in the same rotational plane around the same rotational axis, wherein said further driving track comprises a second stator means and a number of second permanent magnet poles being polarized radially and alternatingly, wherein said alternative embodiment is characterized in that the second permanent magnet poles are fixed to a second permanent magnet rotor arranged for a rotation independent of the first permanent magnet rotor and around a common rotational axis.

Preferably said second permanent magnet rotor drives a fan; and said fan introduces cooling air into the annular gap of the first permanent magnet rotor.

The first driving track of the motor according to the above-stated second embodiment of the present invention need not necessarily be formed and arranged like the driving power track of the first embodiment. Actually, other formations of the first driving track may be used, as disclosed in greater detail in the document EP 0 178 380 A1. However, according to a preferred aspect of the present invention, this first driving track is formed and arranged as previously stated in order to obtain a driving power as high as possible of a given motor volume.

In addition, the second driving track may be formed and arranged in the same manner as previously stated. Especially this formation provides an especially high torque of a comparatively small motor volume and is especially suited for a second driving track located within a ring-shaped chamber which is surrounded by the first driving track.

According to a preferred aspect, the second driving track may however be realized with a simpler arrangement and/or with less expensive magnet materials due to the substantially lower power requirement to rotate the fan. Especially, this second driving track may be realized with an arrangement of a permanent magnet rotor and of a stator means as described in the document EP 0 178 380 A1. For example, a stator means may be used comprising a ring-shaped iron core and a stator coil wound helically along the core circumference. Further, a cylindrical stator means may be used as described with the document DE 36 29 423 C2. The stator means is located within an annular gap formed between two ring-shaped permanent magnets. Said ring-shaped permanent magnets may be made from powdery permanent magnet material dispersed within a plastic matrix. The ring-shaped permanent arrangements are magnetized alternating and laterally. However, with this arrangement each a magnetic north or south of the outer ring is opposite to a magnetic north or south of the inner ring, as described in greater detail in the document EP 0 178 380 A1.

As known in the art, especially the driving motor of a vehicle is subject to often changing running and load conditions wherein the power requirements may vary in a wide range. Especially for such an electrically driven vehicle driving motor it is desirable to provide an electrically driven cooling means which operates independently of the actual number of revolutions of the driving motor. The second independently controllable driving track within the first driving motor track for the driving motor according to the present invention provides such a means for an independently controllable and drivable cooling means. The positioning of the second driving track, whose rotor is fixedly connected to the fan within the housing of the driving motor is highly effective because the cooling air will be introduced into the interior of the motor and there especially into the annular gap subjected to special load and may provide there an immediate and direct cooling action. Additional means and aggregates can be dispensed with, said means and aggregates being necessary requisites for the cooling of conventional internal combustion engines.

A preferred embodiment of said aspect of the present invention relates to a DC motor comprising a relatively flat, essentially cylindrical housing having a round base plate and a round cover plate and a circumferential side wall extending vertically from a circumferential section of said cover plate. A motor bearing is fixedly arranged within a central section of each plate. For example, ball bearings or plane bearings or rolling bearings may be provided. Both motor bearings rotatably support a driven shaft fixedly attached to the first permanent magnet rotor. For example, the driven shaft may be inserted into a central opening of a disk-shaped rotor support means and may be fixed there. The round disk-shaped rotor support means comprising a profile structure at the circumferential section thereof; said profile structure comprising a number of circular grooves and-/or projecting flanges holding the two rings of permanent magnet material and the engaging rings of magnetically conductive material which extend essentially vertically from said rotor support means. The first permanent magnet rotor, the rotor support means and the driving shaft are fixedly secured with each other and form a complete arrangement supported rotatably within the motor housing.

Preferably, this embodiment comprises at least one fan bearing rotatably engaging an outer circumferential section of the driven shaft and rotatably supporting a disk-shaped fan support means. The fan support means comprises a number of vanes extending essentially vertically from a circumferential section thereof. This arrangement provides a ring-shaped area between the number of vanes and the fan bearing, and the components forming the second permanent magnet rotor are located within said ring-shaped area. The vanes may be formed integrally with the fan support means and may preferably form profile elements positioned oblique with respect to the radial direction. Said vanes generate a radial stream of flow of cooling air whenever the fan is rotated. Preferably said vanes extend parallel to the rotational axis of the motor and rotate within a ring-shaped area located between the first driving track and the second driving track.

The fan is fixedly secured to the second permanent magnet rotor which will be activated whenever a desired or given temperature value is reached or exceeded. To said end sensors are provided, which sense the temperature of the adjacent area or of the conductor means of the first stator means. The sensors provide signals which are fed to a control circuit keeping the motor temperature at a given value. Said control circuit activates the fan as required.

Typically, the motor housing is essentially closed and comprises at least one opening through which cooling air may be taken in by the rotating fan. Preferably, a particle filter means covers each take-in-opening in order to remove any particles and impurities from the cooling air before said cooling air enters the motor housing interior. A specific path is provided for the cooling air flow which is forced by the rotating fan; said path passes i.a. the magnetically active annular gap of the first driving track and passes finally one or more exit openings through which the cooling air may escape.

The DC motor according to the present invention comprises—in addition to the above stated components of the driving track(s) and of the cooling means—the known and conventional means for providing an electronic commutation as described in detail with the document EP 0 178 380 A1. This commutation means includes a sensor means for detecting the angular position of the permanent magnet rotor relative to the linear forward or backward extending meander sections of the stator means. Further, an electronic control system is provided which controls the current flow through the stator means according to the signals of the sensor means such that—in the motor mode—a magnetic field is generated driving the permanent magnet rotor. Preferably, the current flow control is effected by a pulse width modulation. A suited circuit for said pulse width modulation is disclosed by U.S. Pat. No. 4,309,675. A control by pulse width modulation allows in a wide range an optimal adaption of the revolution speed and of the torque to the changing operating states of a vehicle driving motor.

Preferably, permanently magneticable materials of high coercivity may be used to generate the permanent magnet poles of the permanent magnet rotor(s). For example, suited magnetic materials include ferrites, especially strontium or barium-ferrites, as well as Sm/Co- or Nd/Fe/B-materials and selected Rare Earth compounds. A suited mutli-polar lateral magnetization generates magnetic field strengths to about 1.2 Tesla and more within the magnetically active annular gap. The direction of the polarization essentially vertical to the rotational axis or radial, respectively, enables the generation and optimal utilization of a high pole number with a relatively small rotor circumference.

For example, an embodiment of a DC motor according to the present invention which may be used as sole driving motor of a passenger car is designed for a nominal power rating of about 100 kW. The first driving power track of said DC motor comprises a circumference of about 100 cm (diameter about 33 cm) and includes a paired arrangement of each 30 permanent magnet poles per ring of the permanent magnet rotor. For example, said permanent magnet poles are made of a Sm/Co sinter material. The permanent magnet poles are supported by a ring made of magnetically conductive material; a suited material is St 37, a carbon containing iron alloy comprising a high magnetic conductivity. The meander-like stator means comprises per phase four electrically separated conductor means each having a cross-sectional area of 1 mm×12 mm. A respective motor generates a starting torque of 280 Nm. In a measuring station, an energy conversion efficiency (including the demand of the control circuit) of 94% has been measured (supplied U×J per obtained driving power (torque ×number of revolutions)). Due to the preferred pulse width modulation (no chopper!), a liner characteristic of torque and number of revolutions is obtained on practically each operating point of the motor. The highest starting torque is obtained already in switching on the current flow.

In the case a motor of the stated design should generate an even higher driving power, the number of power tracks, that is in the number of the first driving power tracks may be increased. According to said aspect, a motor of the stated design may comprise two (first) power driving tracks within a given rotational plane around a common rotational axis. The number of ring-shaped permanent magnet arrangements required thereto is fixedly attached to a common rotor support means which is fixedly connected to the driven shaft.

In the following, the invention will be explained in more detail with reference to preferred embodiments and referring to the accompanying drawings.

DESCRIPTION OF THE FIGURES

FIG. 3 is a perspective view of a part of a meander-like stator means comprising two electrically separated conductor means;

FIG. 8a and 8b is a side view or a top view, respectively, illustrating schematically and partially the fan arranged within the motor according to FIG. 7.

DESCRIPTION OF THE PREFERRED EMBODIMENT

Figure 1:
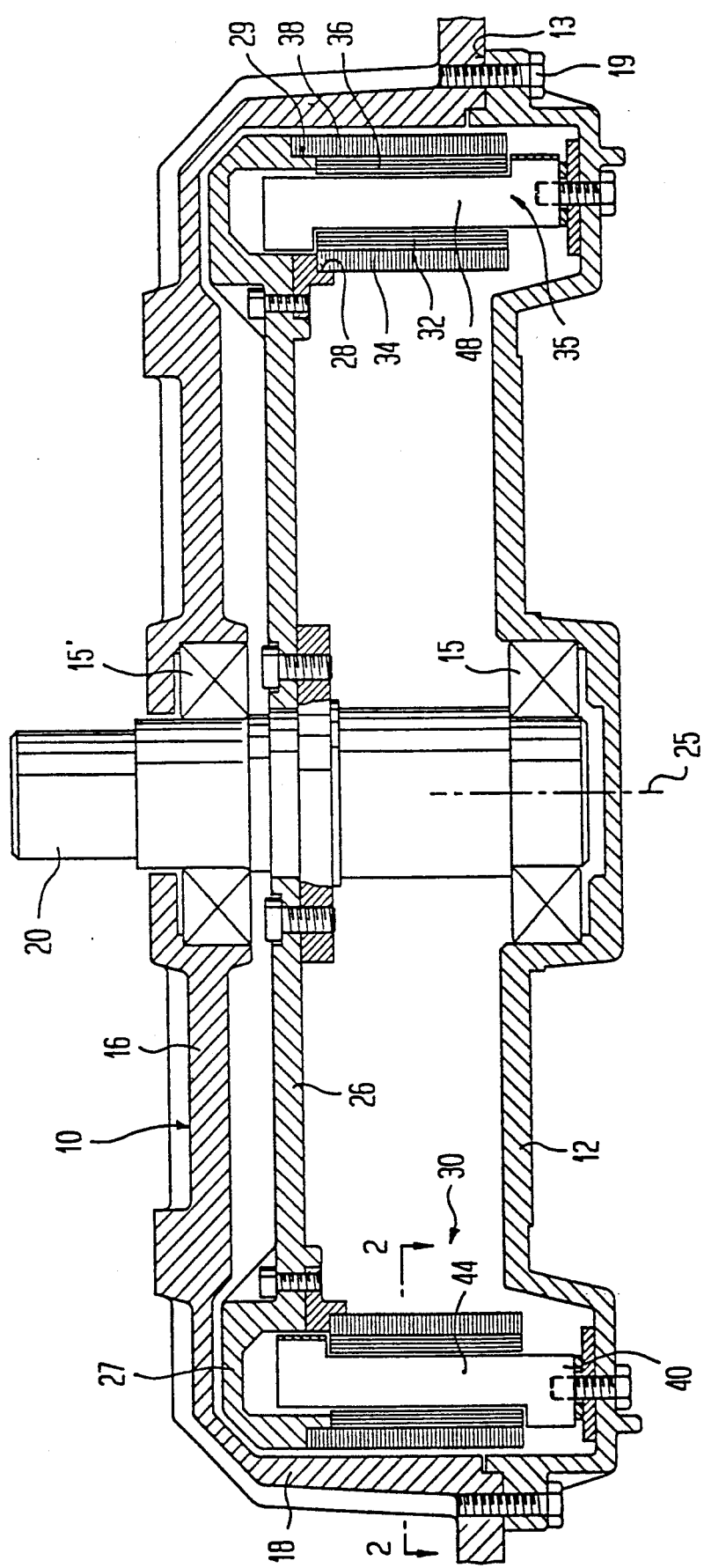
FIG. 1 is a schematic cross-sectional view—parallel to the rotational axis—of a first embodiment of a DC motor according to the present invention.

FIG. 1 illustrates—schematically and in a cross-sectional view—a front embodiment of a motor according to the present invention. The essential components of said motor includes a two-part housing 10, a driven shaft 20 including a rotor support means 26 and a permanent magnet rotor 30 attached thereto, and a meander-like stator means 40. The motor housing 10 comprises essentially a base plate 12 and a cover plate 16 and a circumferential side wall 18 formed integrally with and extending vertically from a circumferential section of the cover plate 16. The base plate 12 comprises a circumferential step 13, and the side wall 18 is inserted in said step 13 and is fastened there by fastening means 19. A deepening is formed within a central section of the base plate 12, and a motor bearing 15 is inserted within said deepening. An opening is recessed within a central section of the cover plate 16, and a further motor bearing 15' is inserted within said opening.

Said two motor bearings 15 and 15' arranged in spaced relationship and aligned with each other support rotatably a drive shaft 20. The driven shaft 20 is arranged parallel and rotationally symmetrically to the rotational axis 25 of the motor. A disk-shaped rotor support means 26 is attached rigidly and fixedly to the driven shaft 20. The rotor support means 26 comprises an outer circumferential section, and a channel-like profile 27 is attached to said circumferential section; and profile 27 comprises an inner step 28 and an outer step 29.

An inner ring 34 made of magnetically conductive material is inserted in the inner step 28. An outer ring 38 made of magnetically conductive material is inserted in the outer step 29. An inner ring-shaped arrangement 32 of permanent magnets is attached to an outer circumferential face of the inner ring 34. An outer ring-shaped arrangement 36 of permanent magnets is attached to an inner circumferential face of the outer ring 38. Each ring-shaped arrangement 32, 36 may comprise single permanent magnets or may form a continuous ring made of permanent magnet material and magnetized alternatingly. The complete set of rings 32, 34, 36 and 38 is fixedly connected to the channel-type profile 27 of the rotor support means 26 and extends essentially vertically therefrom. The rings 32, 34, 36 and 38 form the permanent magnet rotor 30. A magnetically active annular gap is formed between the inner ring-shaped arrangement 32 and the outer ring-shaped arrangement 36.

A meander-like stator means 40 is attached to the base plate 12 and comprises a number of linear forward extending meander sections 14 and linear backward extending meander sections 48 located within the annular gap 35. The width of the annular gap 35 is selected a little bit larger than the width of the linear meander sections 44, 48, such that a free rotation of the permanent magnet rotor 30 is provided with respect to the stator means 40.

Figure 2:
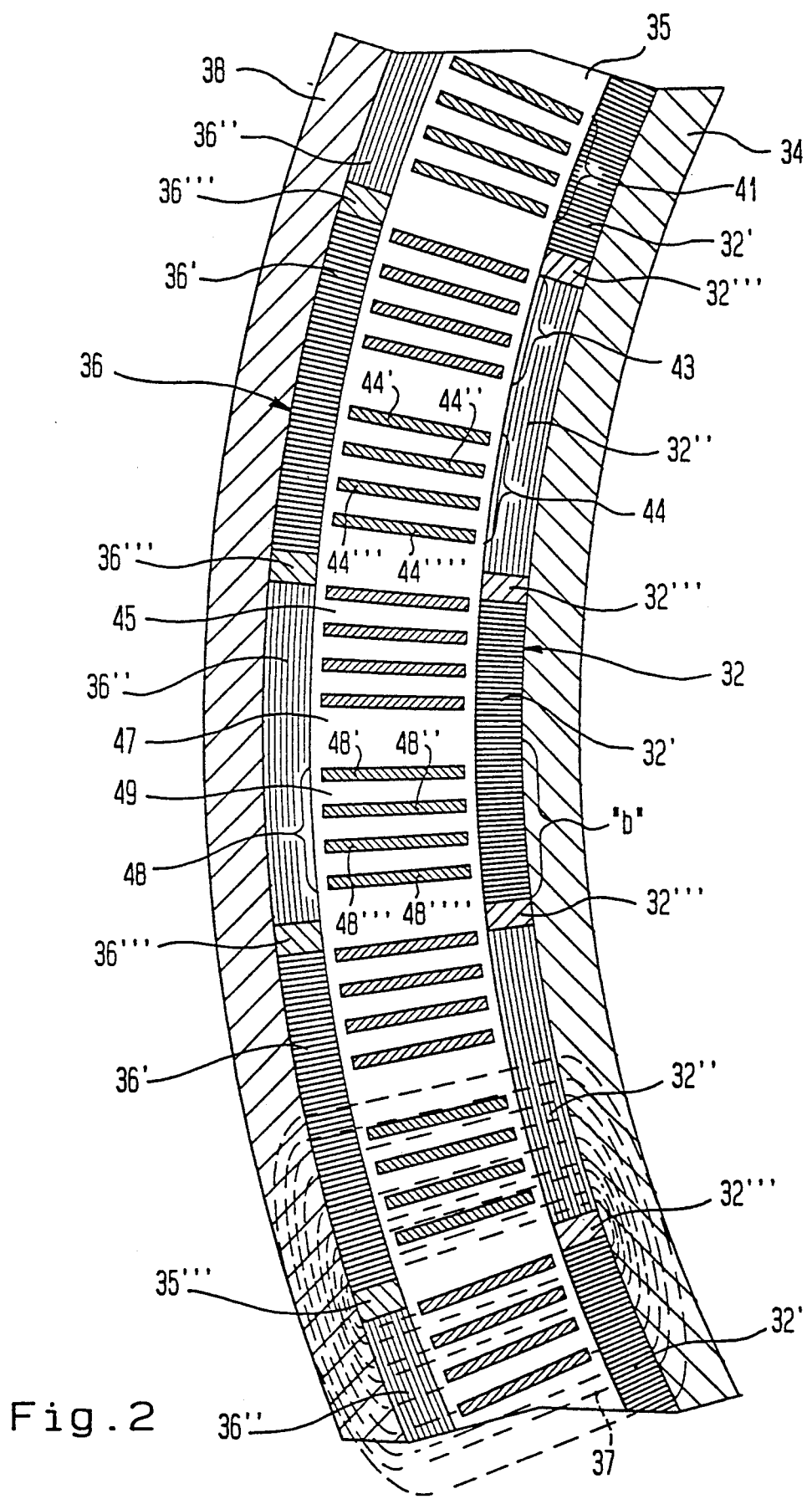
FIG. 2 is a cross-sectional view along the line 2—2 of FIG. 1 illustrating schematically and partially the extension of the magnetic field lines and the arrangement of the conductor means within the annular gap of the first permanent magnet rotor.

The permanent magnet rotor 30 and the conditions within the annular gap 35 are explained in greater detail with reference to FIG. 2. Each, the outer ring 38 and the inner ring 34 are made of a magnetically conductive material, for example ST 37. The outer ring 36 is made of a permanent magnet material and has been magnetized alternatingly and laterally, such that magnetic north 36' and magnetic south 36" are provided alternatingly. Opposite magnetic poles 36' and 36" are separated by a small neutral zone 36'''. In the same manner, the inner ring 32 is made of a permanent magnet material and has been magnetized alternatingly and laterally, such that magnetic north 32' and magnetic south 32" are provided alternatingly. Again, opposite magnetic poles 32' and 32" are separated by a small neutral zone 32'''. For example, Sm/Co sinter material may be used as permanent magnet material.

As illustrated, in any case magnetic north 36' of the outer permanent magnet ring 36 is arranged oppositely to magnetic south 32" of the inner permanent magnet ring 32, and vice versa. A homogeneous magnetic field comprising linear and essentially parallel extending magnetic field lines is provided within the magnetically active annular gap 35, as illustrated by the field lines 37. The magnetic field lines 37 are closed via the magnetically active material 34 and 38 thus providing a magnetic field of high field strength within the annular gap 35.

According to the illustrated specific embodiment, the meander-like stator means 40 comprises two meander-like conductor arrays 41 and 43 arranged within each other. Each meander-like conductor array 41, 43 comprises four independent and electrically separated conductor means arranged geometrically parallel. Therefore, each meander-like conductor array 41, 43 comprises a number of linear forward extending meander sections 44 comprising four linear conductor sections 44', 44'', 44''' and 44''''. In the same manner, each linear backward extending meander section 48 comprises four linear conductor sections 48', 48'', 48''' and 48''''. Between adjacent forward extending conductor sections, for example between the conductor sections 44' and 44", and between adjacent backward extending conductor sections, for example between the conductor sections 48' and 48", a sufficient spacing 45 and 49, respectively, is provided in order to separate electrically adjacent conductor means from each other. Small insulated distance piece (not illustrated) may be inserted in said spacings 45, 49.

A sufficient spacing is provided between a linear forward extending meander section 44 and the following linear backward extending meander section 48 of a conductor array 41 thus to insert a linear meander section of another conductive array 43 in said spacing. A larger spacing 47 is provided between two adjacent linear meander sections. Large insulating distance pieces (not illustrated) may be inserted in said larger spacings 47 and extend along the complete axial length of the annular gap 35. The small and large insulating distance pieces are made of a thermostable, electrically insulating and magnetically inert material, for example $Al_2O_3$.

As illustrated, the width of a linear forward or backward extending meander section 44 or 48 is less than half pole width "b" of a permanent magnet pole 32', 32"; 36', 36".

As illustrated, each conductor section, for example the conductor sections 44', 48', has a rectangular cross-sectional area. Said conductor cross-sectional area comprises at least a long side and at least a narrow side.

The long side of the conductor cross-sectional area is arranged parallel to the magnetic field lines 37 within the magnetically active annular gap 35.

An embodiment of a meander-like stator means 40 is explained in greater detail with reference to FIG. 3. In order to provide a simpler illustration, a specific stator means 40 has been selected comprising a meander-like conductor array made of two conductor means 40' and 40". This meander-like stator means 40 comprises a linear forward extending meander section 44, an upper (inner) winding head 42, a linear backward extending meander section 48, a lower (outer) winding head 46, and again a linear forward extending meander section 44, and so on. The linear forward and backward extending meander sections 44, 48 are located within the magnetically active annular gap 35. In an area above and below the annular gap 35, the conductor means 40', 40" forming the stator means 40 extend laterally or radially, respectively, from an imaginary extension of the annular gap 35 and form the winding heads 42, 46. The winding heads 42, 46 extend essentially parallel to the annular gap 35, but in radial direction outside of the imaginary extension of the annular gap 35. The conductor sections 40', 40" forming the winding heads 42, 46 comprise the same conductor cross-sectional area as the conductor sections 40', 40" forming the linear forward or backward extending meander sections 44, 48.

The manufacturing of a meander-like stator means 40 as described starts from a plane flat-material. Strips are cut or punched out of said flat-material having the desired configuration. These plane strips are shaped by suited male dies in a stamping machine in order to obtain the desired three-dimensional structure. A 1 mm thick copper sheet metal provides a solid self-supporting meander-like stator means 40 having the configuration as illustrated with FIG. 3.

Figure 4A:
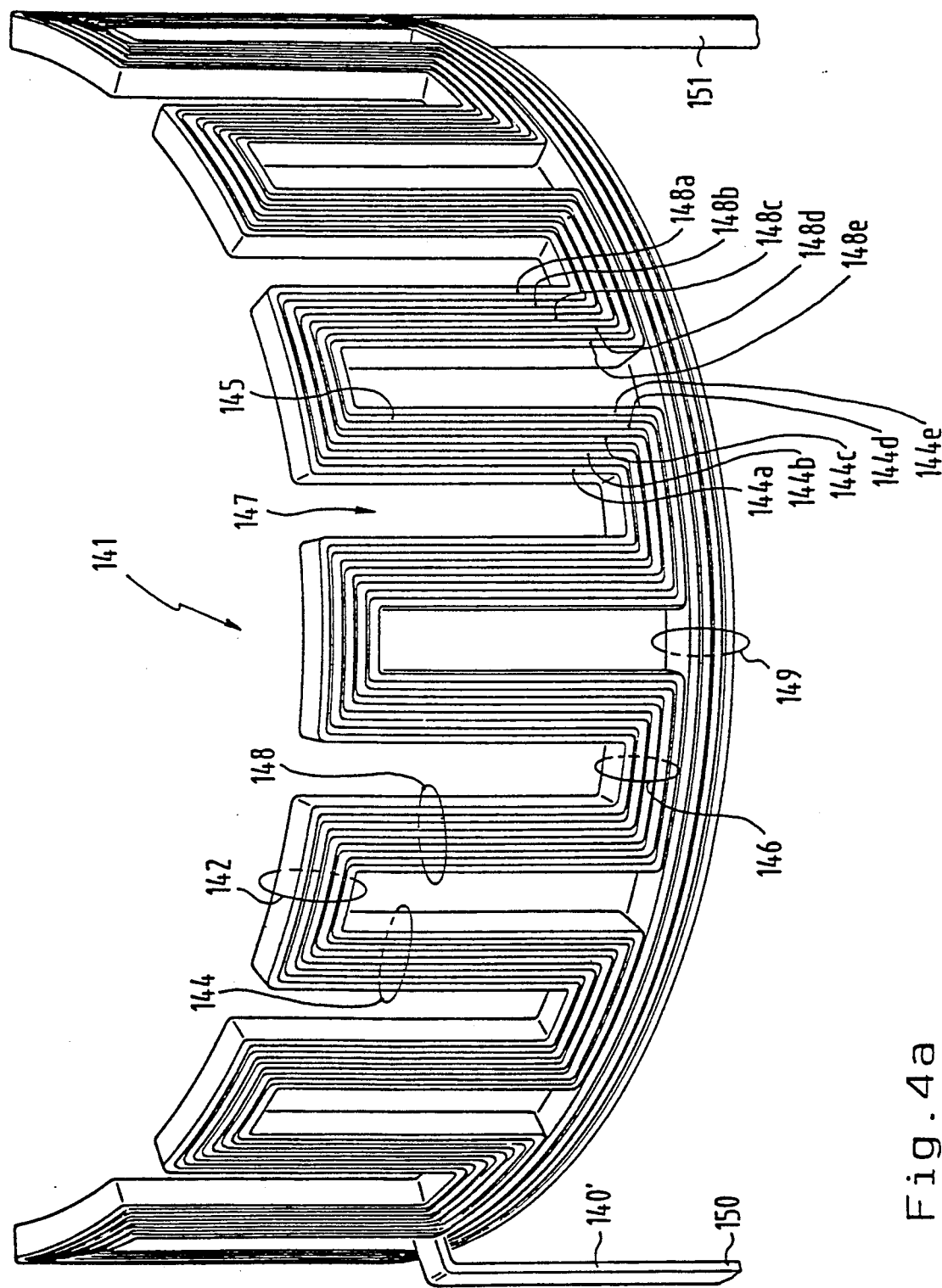
FIG. 4a is a schematic diagonal view of a semicircular meander-like conductor array segment made of a strip-like conductor material having a rectangular cross-sectional area.
Figure 4B:
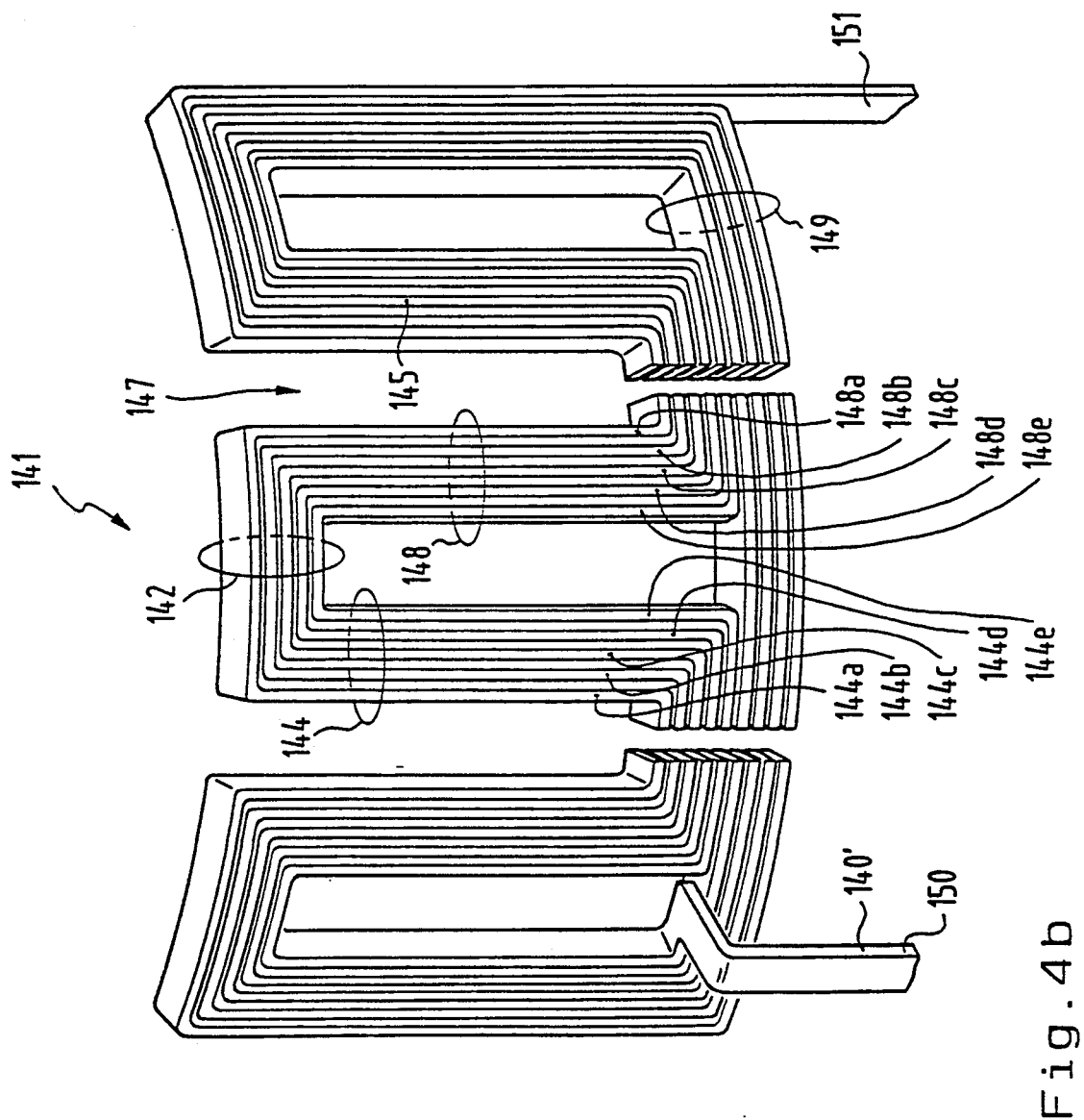
FIG. 4b is a part of the conductor array segment according to FIG. 4a, especially illustrating the starting and final meander sections and the return sections.
Figure 5:
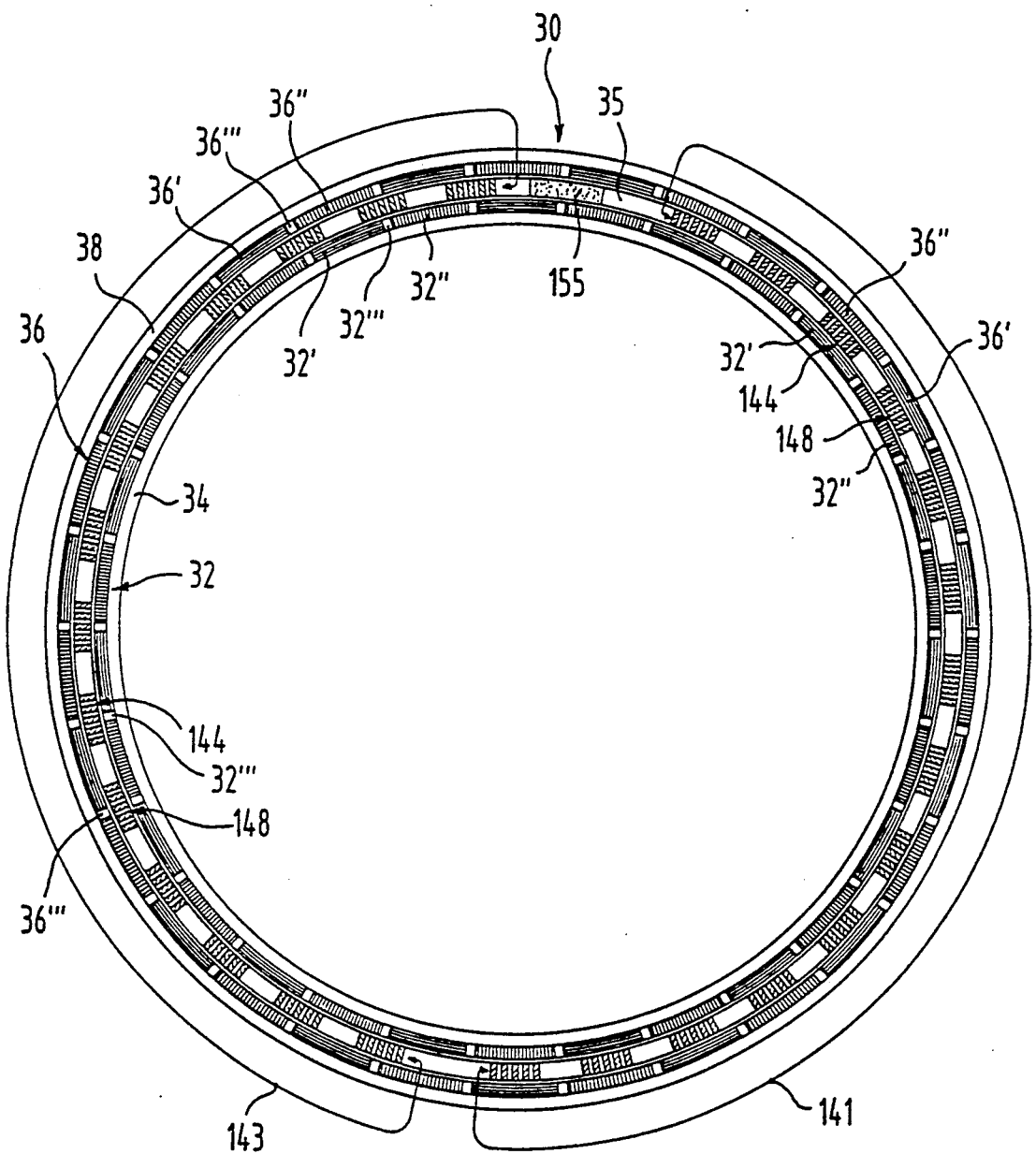
FIG. 5 is a cross-sectional view of the staggered arrangement of two conductor array segments according to FIG. 4a, 4b within a cylindrical annular gap formed between two ring-shaped magnet arrangements of the rotor; the two conductor array segments—when taken together—form a second embodiment of a meander-like stator means.

With reference to FIG. 4a, 4b and 5 a further embodiment of a meander-like stator means according to the present invention is explained comprising two essentially semicircular, meander-like conductor array segments.

The meander-like conductor array segment 141 as depicted with FIG. 4a and 4b extends over a 168° circumference section of the annular gap. In a further 12° circumference section Hall-Sensors are arranged for sensing the moments when the magnetic flux crosses zero between adjacent permanent magnet poles of the rotor. The conductor array segment 141 is made from a single non-interrupted piece of strip-like conductor-material 140' having an essentially rectangular cross-sectional area and comprising an input terminal 150 and an output terminal 151. During the manufacturing process the practically continuously long, initially essentially plane, strip-like conductor material has been bent right-angled in given distances in order to form step-by-step linear forward extending meander sections 144,
upper winding heads 142,
linear backward extending meander sections 148,
lower winding heads 146, and
return sections 149.

The width of a linear meander section 144 or 148—that is the dimension in a circumferential direction—corresponds to a half pole width of a permanent magnet pole. A spacing 147 is provided between two adjacent linear meander sections 144 and 148, having a width which corresponds essentially to the width of a meander section 144 or 148. Each linear meander section 144 or 148 comprises five conductor sections 144a, 144b, 144c, 144d and 144e, respectively, 148a, 148b, 148c, 148d and 148e, electrically connected in series, due to the manufacturing process. Two by two adjacent conductor sections, for example 144a and 144b or 148c and 148d are arranged parallel and distantly such to form small spacings 145 between two adjacent conductor sections. Cooling air may be fed force-wise through said small spacings 145. The adjacent conductor sections engage each other when forming the upper winding 142, the lower winding heads 146 and the return sections 149. An undesired current flow is avoided by the utilization of all round insulated conductor material 140'. In addition, an electrically insulating hardened resin is provided with the lower winding heads 146 and with the return sections 149 to improve the stability of the self-supporting conductor array segment 141.

FIG. 5 explains a staggered arrangement of two semicircular conductor array segments 141 and 143 within a cylindrical annular gap 35 of a permanent magnet rotor 30. Each semicircular conductor array segment 141 and 143 comprises a structure as explained with reference to FIG. 4a and 4b. The permanent magnet rotor 30 comprises an inner ring 34 made of magnetically conductive material. This inner ring 34 comprises an outer circumferential surface, and an inner ring-shaped arrangement 32 of permanent magnets engages said outer circumferential surface. Further, the permanent magnet rotor 30 comprises an outer ring 38 having an inner circumferential surface. An outer ring-shaped arrangement 36 of permanent magnets engages said inner circumferential surface. Each ring-shaped magnet arrangement 32, 36 comprises a number of single, piece-like permanent magnet poles 32', 32"; 36', 36" made of Co/Sm sinter material being alternatingly magnetized and having a back which is attached to each a ring 34 or 38, respectively, made of magnetically conductive material. An arrangement is provided wherein each a magnetic north 32' or magnetic south 32" of the inner ring 32 is located oppositely to magnetic south 36" or magnetic north 36' of the outer ring 36. Each neutral zone 32''' or 36''', respectively, is arranged between adjacent opposite poles 32' and 32" or 36' and 36", respectively. A homogeneous magnetic field is obtained within the magnetically annular gap 35, comprising a linear, radially extending and essentially parallel direction of the magnetic field lines, and having a continuously changing polarity.

A preferred embodiment comprises per ring-shaped magnet arrangement 32 or 36 a complete number of thirty permanent magnet poles 32' or 32", and 36' or 36", respectively. The width of each linear, forward or backward extending meander section 144, 148 corresponds essentially to a half pole width of the permanent magnet poles 32', 32"; 36', 36".

In a given rotor position the location of a first conductor array segment 141 is selected such that the complete number of linear meander sections 144, 148 is located in the middle of oppositely arranged, opposite permanent magnet poles 32' and 36", respectively, 32" and 36' (see FIG. 5, the right half thereof). However, maintaining the rotor in the same given position, a second conductor array segment 143 is arranged staggered in the direction of the annular gap 35 about a half pole width of the permanent magnet poles. An arrangement is obtained, where the complete number of linear meander sections 144, 148 of the second conductor array segment 143 is located essentially between aligned neutral zones 32''' and 36''' and the adjacent pole sections of the inner and outer magnet arrangements 32 and 36. Typically, each of these two staggered arranged and electrically separated conductor array segments 141 and 143 is controlled with a 90° electrical phase displacement, with respect to the other conductor array segment.

Between the two such arranged conductor array segments 141 and 143 a larger circumferential spacing is provided housing a Hall-Sensor 155 which senses every moment when the magnetic field between two adjacent permanent magnet poles 32', 32" respectively 36', 36" of the rotating rotor 30 crosses zero.

Figure 6:
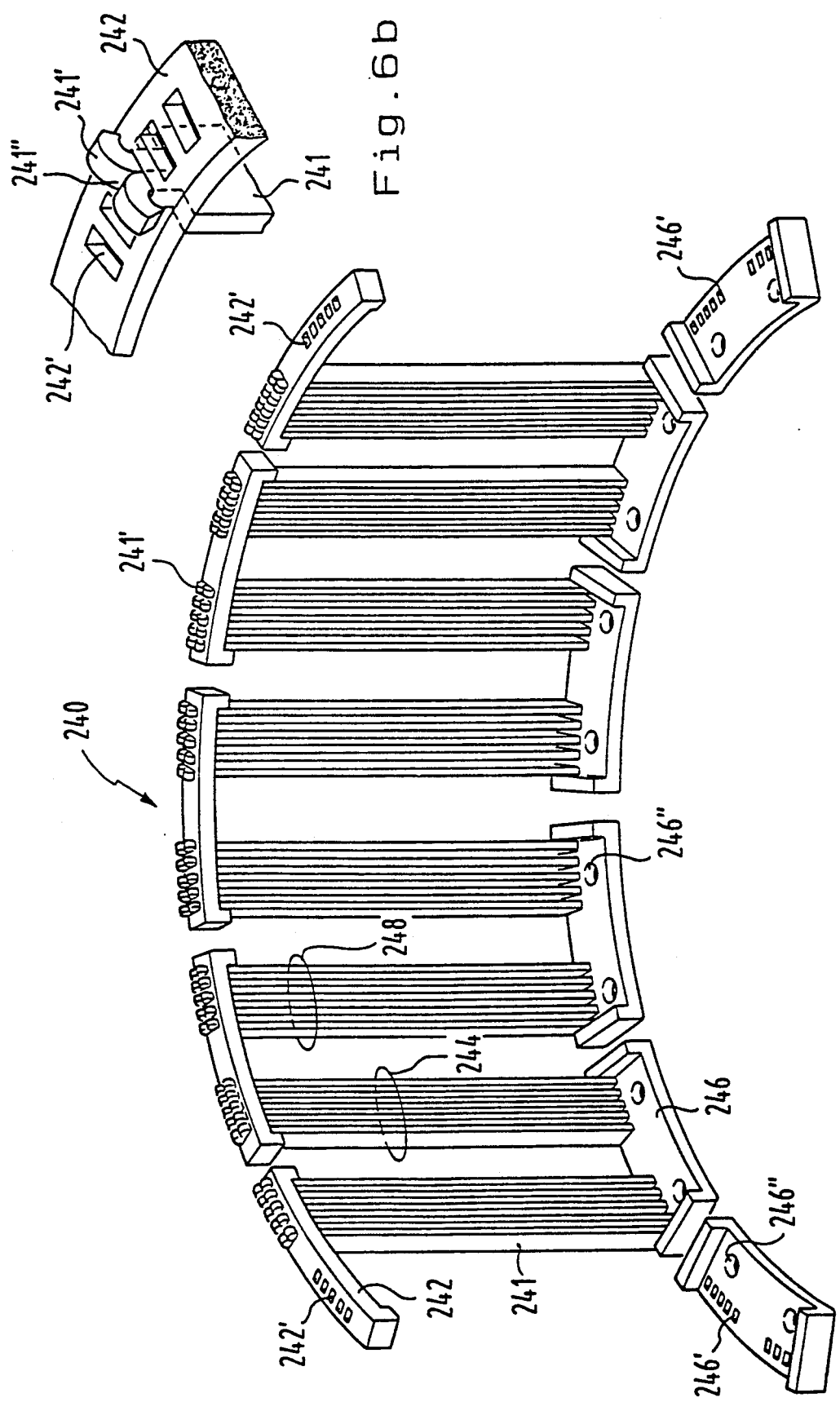
FIG. 6a in a schematic diagonal view a part of a third embodiment of a meander-like stator means composed of a number of single meander section elements and of a number of single winding head elements.
FIG. 6b a detail of the composed conductor arrangement according to FIG. 6a, that is the beading of the lug sections of the meander section elements.

FIG. 6a illustrates a part of another embodiment of a stator means according to the present invention which comprises a composed meander-like conductor array 240 consisting each of a number of single meander section elements 241, upper winding head elements 242 and lower winding head elements 246. Each meander section element 241 is made from a lengthy, linear piece of conductor material having a rectangular cross-sectional area and comprising each an extending lug 241' at the opposite end sections thereof. Each extending lug 241' comprises a center slit or slot 241" forming two lug sections for a beading operation. Each winding head element 242, 246 comprises a curved piece of conductor material having a larger cross-sectional area than the meander section elements 241 and having suited arranged openings 242', 246' for passing each a lug 241' of the meander section elements 241. By a following beading operation of the lug sections (see FIG. 6b), the meander section elements 241 will be connected mechanically fixed and electrically conductive with an appropriate upper winding head element 242 and lower winding head element 246, respectively. The openings 242' and 246' are arranged in such a manner that linear forward extending meander sections 244 and linear backward extending meander sections 248 of a composed conductor array 240 will be obtained after completion of assembling thereof. Obviously, the complete number of meander sections 241 forming a forward or backward extending meander section 244, 248 are connected electrically parallel.

The lower winding head elements 246 may comprise a larger length dimension in order to provide additional space for bores 246" intended for passing fastening screws. The lower winding head elements 246 may directly engage a base plate of the DC machine and may be fixed thereto by means of fastening screws—not illustrated. The length dimension of the upper winding head elements 242 corresponds to the length dimension of the conductor cross-sectional area of the meander section elements 241. Therefore, this composed conductor array 240 may be inserted easily into a cylindrical annular gap formed between to ring-shaped magnet arrangements of a permanent magnet rotor.

Figure 7:
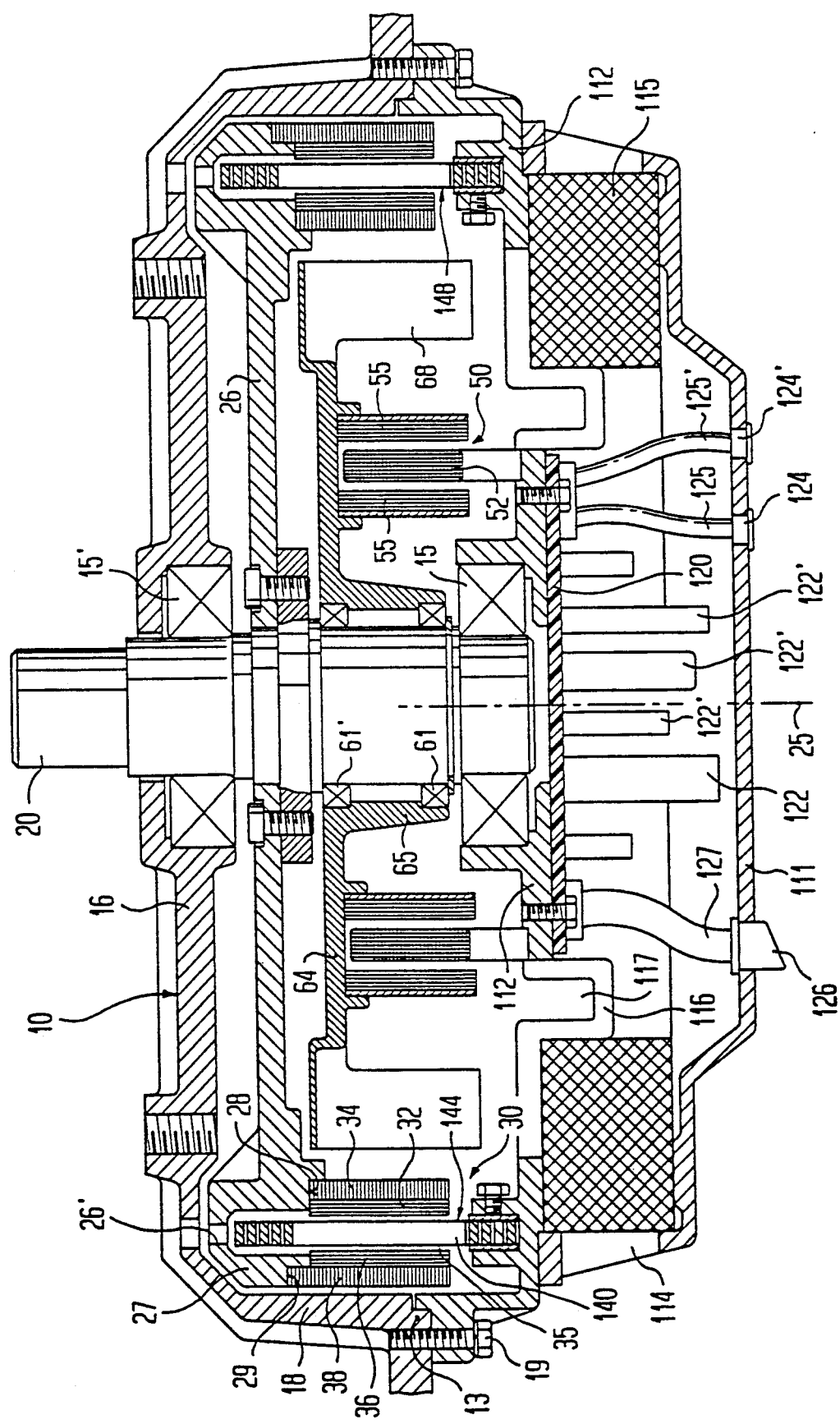
FIG. 7 is a schematic cross-sectional view—parallel to the rotational axis—of a second embodiment of a DC motor according to the present invention comprising additionally a fan arranged within the motor housing.

The FIG. 7 illustrates a further embodiment of a DC-motor according to the present invention. The DC motor according to FIG. 7 has essentially the same structure as the motor according to FIG. 1, but comprises additionally a second driving track enabled to be controlled independently and arranged within the motor housing and intended to drive a fan 60 located within the motor housing and provided to produce cooling air adapted to cool the first driving power track.

The DC motor comprises a motor housing 10 consisting essentially of a base plate 112, of a ventilating cup 111 and of a cover plate 16 having a circumferential area and a circumferential side wall 18 formed integrally with the circumferential section of the cover plate 16. The base plate 112 supports a meander-like stator means 140 comprising two essentially semicircular conductor array segments 141 and 143, as previously explained with reference to FIG. 4a and 4b. The conductor array segments 141, 143 comprise linear forward extending meander sections 144 and linear backward extending meander sections 148, both extending within an annular gap 35. The width of the annular gap 35 is slightly larger than the width of the linear meander sections 144, 148, thus enabling a free rotation of a permanent magnet rotor 30 with respect to a stationary stator means 140.

The ventilating cup 111 comprises a circumferential wall having recessed a number of air in-take openings 114 arranged in small distances to each other around the complete circumference. Within the ventilating cup and engaging the air in-take openings 114, a ring-shaped air filter means 115 is located made from folded paper material. The air filter means 115 comprises an inner circumferential section engaging a number of air guiding plates 116 extending vertically from the base plate 112. The base plate 112 comprises air venting openings 117 recessed between adjacent air guiding plates 116 and enabling an air flow through said air venting openings 117 into an inner space of the DC motor. Within the ring-shaped arrangement of air guiding plates 116, a mounting plate 120 is provided for mounting the electric and electronic components 122, 122', 122", 122''' of a motor control means. Obviously, said components 122, 122', 122", 122''' extend into a cooling air flow and will be cooled continuously. In addition, the ventilating cup 111 comprises two current terminals 124 and 124', and a connection pin plate 126 of multicontact connector means. A conductor strip means 127 connects the connection pin plate 126 with the mounting plate 120. A pair of solid current conductor means 125, 125' connect the current terminals 124, 124' with the mounting plate 120.

In greater detail, a disk-shaped fan support means 64 is provided having an opening in the central section thereof. A tube section 65 formed integrally with said fan support means 64 extends vertically therefrom around said opening. An inner circumferential face of said tube section 65 has been formed like a slide bearing and engages an outer circumferential face section of the driven shaft 20. Alternatively, as illustrated in FIG. 7, this tube section 65 is supported on two spaced arranged fan bearings 61, 61', engaging said outer circumferential face section of the driven shaft 20. In any case, a free and independent rotation of the fan support means 64 is provided with respect to the driven shaft 20. A number of profiled fan vanes 68 are formed integrally with an outer circumferential section of the fan support means 64 and extend vertically therefrom; said fan vanes 68 generate a radial cooling air flow whenever the fan 60 is rotated. The cooling air may be taken in through the air intake openings 114, the air filter means 115 and the air venting openings 117; said cooling air is accelerated with the fan 60 and flows through the annular gap 35. There the cooling air flows through the narrow spacings arranged between adjacent conductor means and further the cooling air flows through the larger spacings arranged between adjacent meander sections 144, 148 in order to cool down the stator means 140. Finally, the cooling air escapes out from the interior of the motor housing 10 into the environment through openings 26' recessed at the rotor support means 26 and through openings 17 recessed at the cover plate 16. The openings 26' are arranged in a direction of an extension of the annular gap 35 and distantly to each other. In addition, the bores of the openings 26' are aligned oblique with respect to the circumferential path of revolution, in order to provide a suction flow whenever the rotor support means 26 is rotated.

The fan 60 is driven by a second driving track enabled to be controlled independently of the status or mode of the motor. Said second driving track 50 comprises a second stator means 52 and a second permanent magnet rotor 55. The second stator means 52 and the second permanent magnet rotor 55 have been adapted to the relatively small power demand required to rotate the fan 60. Any current flow through the second stator means 52 is controlled by a control circuit thus that the current flow is activated whenever—non-illustrated—sensor means detect a motor temperature which exceeds a given temperature value.

The FIGS. 8a and 8b illustrate details of the construction of the fan 60 and of the second driving track. As shown in a top view and in a side view, respectively, the fan 60 comprises a ring-shaped fan support means 64 including a sleeve 65 formed integrally and extending vertically on an inner circumferential section thereof for placing/forming a fan bearing and further including a number of fan vanes 68 formed integrally and extending vertically on an outer circumferential section thereof. The components of a second permanent magnet rotor 55 are located between two flanges 62 and 63 arranged concentrally and connected rigidly to the fan 60 and extending .vertically therefrom. These components include an inner ring 56 made of magnetically conductive material, an inner ring 57 made of permanent magnet material, an outer ring 58 made of permanent magnet material and an outer ring 59 made of magnetically conductive material. The ring-shaped permanent magnet 57, 58 may be made of low-priced "rubber magnets" comprising permanent magnet material powder dispersed within a plastic matrix; said rubber magnets have been magnetized alternatingly and laterally. A specific arrangement is provided wherein each magnetic north 58' or magnetic south 58" of the outer ring 58 is located oppositely to a magnetic north 57' or magnetic south 57" of the inner ring 57. This means, a given magnetic pole 58', 58" of the outer ring 58 is arranged oppositely to a respective magnetic pole 57', 57" of the inner ring 57 having the same magnet polarity. A second stator means 52 extends within the annular gap formed between the permanent magnet rings 57, 58. In the present case, the second stator means 52 comprises a ring-shaped iron core provided with a stator winding.

It is claimed:

1. An electronically commutated DC machine, especially an electronically commutated DC motor comprising:
    a permanent magnet rotor defining a cylindrical annular air gap, centered about a rotational axis, having a homogeneous magnetic field with linear and radially extending magnetic field lines and with a continuously changing polarity within said essentially cylindrical annular gap,
    an air-core and meander-like stator means including linear forward or backward extending meander sections parallel to the rotational axis and extending within the annular gap wherein each linear forward or backward extending meander section comprises a number of conductor sections geometrically parallel and having an essentially rectangular cross-sectional area, a longer side of the conductor cross-sectional area extending parallel to the direction of the magnetic field lines.

2. A DC machine according to claim 1, wherein the permanent magnet rotor comprises a number of permanent magnet poles polarized radially, essentially vertical to the rotational axis and forming an outer ring and an inner ring, respectively, defining said annular gap between the outer ring and the inner ring, wherein in each ring adjacent poles are polarized alternatingly such that magnetic north or south of the outer ring is opposite magnetic south or north of the inner ring.

3. A DC machine according to claim 2, wherein a space between adjacent permanent magnet poles forms a neutral zone within an outer ring or inner ring, substantially corresponding to a radial dimension of the annular gap.

4. A DC machine according to claims 1, 2, 3, wherein the rectangular conductor cross-sectional area comprise at least said long side and at least a narrow side, and wherein a ratio of the long side length to the narrow side length is at least larger than 2:1.

5. A DC machine according to any one of claims 1, 2, 3, wherein each linear forward extending meander section is connected with an adjacent backward extending meander section by a respective winding head extending in a radial direction from an imaginary extension of the annular gap and extending essentially parallel to said annular gap outside of said imaginary extension of the annular gap.

6. A DC machine according to claims 1, 2, or 3, wherein each linear forward extending meander section is connected with an adjacent backward extending meander section by a respective winding head, constituting a first meander-like conductor array including upper winding heads within an imaginary extension of the annular gap, permitting an axial insertion of said first meander-like conductor array within the annular gap.

7. A DC machine according to claim 6, wherein the first meander-like conductor array comprise a first, essential semicircular, conductor array segment and a second essentially semicircular conductor array segment, electrically separated from the first conductor array segment, said conductor array segments being of the circumferential dimension and located within the annular gap, the second conductor array segment comprising linear forward or backward extending meander sections staggered a half pole width of the permanent magnet poles in the direction of the annular gap with respect to linear forward or backward extending meander sections of the first conductor array segment.

8. A DC machine according to claim 7, wherein a first meander-like conductor array segment are made of a single piece of uninterrupted strip-like conductor material having an essentially rectangular cross-sectional area in a continuously long and partially linear-strip-like conductor material forming a solid, self-supporting meander-like stator means having a series of linear forward extending meander sections, upper winding heads, linear backward extending meander sections, lower winding heads and subsequent linear forward extending meander sections, and further comprising return sections connecting the final linear backward extending meander section with the first linear forward extending meander section.

9. A DC machine according to claim 8, wherein a hardenable resin is deposited in the region of the lower winding heads and in the region of the return sections, and is formed in a partial circle segment of a cylinder.

10. A DC machine according to claim 7, wherein the first and the second conductor array segments comprise a number of single winding head elements and a number of single meander section elements, and each meander section element forms a linear meander section which is connected to an upper winding head element and to a lower winding head element so that the meander sections are connected in parallel.

11. A DC machine according to claim 10, wherein each meander section includes a lug at the opposite end sections thereof, each extending lug having a slit which forms two lug sections, each lug extending through an opening recessed in the winding head elements and thereafter having a bent portion.

12. A DC machine according to claim 1, wherein the meander-like stator means comprise a number of spaced parallel conductor means, an distance pieces inserted at regular intervals between adjacent conductor means, said distance pieces being made of a thermostable, electrically insulating and magnetically inert material.

13. A DC machine according to claim 1, wherein each ring of permanent magnet poles engages at the side thereof spaced from the annular gap, a further ring made of magnetically conductive material for closing a magnetic flus circuit.

14. A DC machine according to claim 13, wherein the inner ring and the further rings of magnetically conductive material have aligned openings, whereby cooling air may be fed through said openings and introduced in the annular gap, between the conductor means for cooling said conductor means.

15. A DC machine according to claim 1 further comprising:
a second stator having a central axis coinciding with said rotational axis; and,
a second rotor which rotates about said rotational axis, independent of said first rotor, having a plurality of permanent magnet poles with a radial polarization, whereby a second motor is formed.

16. An electronically-commutated DC machine comprising:
a first cylindrical driving power track having a first meander-like stator means and a first permanent magnet rotor of a plurality of permanent magnet poles, having a radial polarization with respect to a rotational axis, adjacent said poles alternating in polarity; and,
a second cylindrical driving power track having a second stator means, and a second rotor including a second plurality of permanent magnet poles polarized radially, and vertical to the rotational axis, having a polarization sense which changes between adjacent permanent magnet poles, said second rotor having a rotational axis coincident with aid first rotational axis, and is supported for independent rotation with respect to said first rotor.

17. A DC machine according to claim 16, further comprising a fan driven by the second permanent magnet rotor, said fan forcing cooling air into the annular gap of the first permanent magnet rotor.

18. A DC machine according to claim 17, wherein the fan comprises a disk-like fan support means, rotatably engaging at least one fan bearing, the fan support means having a number of vanes extending essentially vertically from a circumferential section of the fan support means, and generating a radial stream of cooling air, whenever the fan is rotated.

19. A DC machine according to claim 17, wherein the DC machine includes a relatively flat, essentially cylindrical, motor housing having a round base plate, a round cover plate and a circumferential side wall extending vertically from a circumferential section of the cover plate, a motor bearing within a central section of each plate, said motor bearings supporting a driven shaft fixedly attached to the first permanent magnet rotor, and a fan bearing which rotatably engages the outer circumferential section of the driven shaft.

20. A DC machine according to claim 19, wherein said motor housing is closed, and said housing includes a number of openings through which cooling air may be drawn in by the rotating fan.

21. A DC machine according to claim 20, wherein a particle filter means covers each opening.

22. A DC machine according to claim 17, wherein a mounting plate is arranged within the motor housing, said mounting plate supporting components into a path of cooling air flow generated by the fan for cooling said components.

23. A DC machine according to claim 22, wherein the second stator means comprises a ring-shaped iron core provided with a stator winding.

24. A DC machine according to claim 23, wherein the second permanent magnet rotor comprises two concentrically ring-shaped arrangements of permanent magnets, magnetized alternatingly laterally with magnetic poles of the same polarity of different ring-shaped arrangements being located opposite each other.

25. A DC machine according to claim 18, wherein the second permanent magnet rotor comprises an outer ring made of magnetically conductive material, an outer ring made of permanent magnet material and engaging said outer ring, an inner ring made of magnetically conductive material, an inner ring made of permanent magnet material and engaging said inner ring, and each ring is fixedly arranged to the fan support means of the fan.

* * * * *